(No Model.) 4 Sheets—Sheet 2.

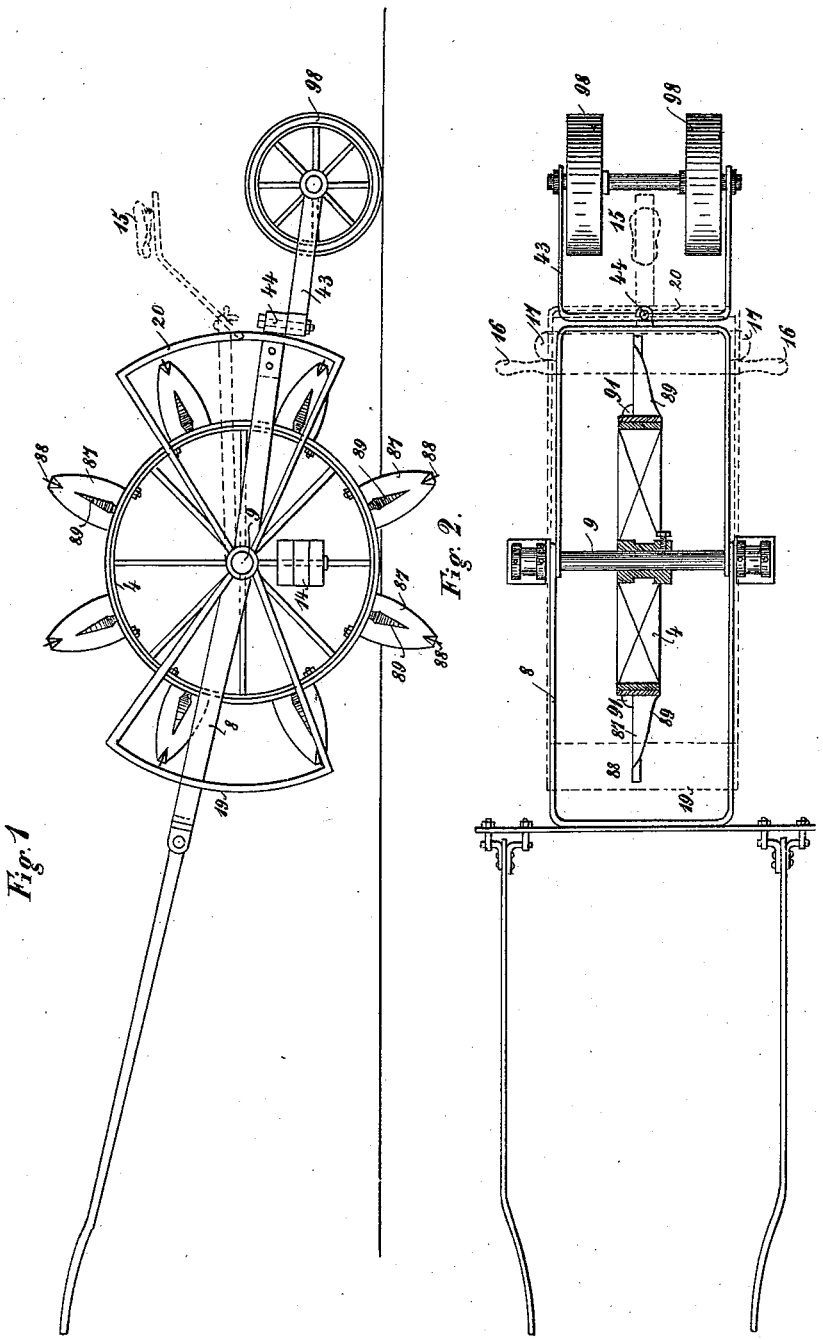

G. K. SPITZENBERG.
DIBBLING MACHINE.

No. 545,545. Patented Sept. 3, 1895.

Witnesses.

Inventor.
G. K. Spitzenberg
by Hadden
Attorney.

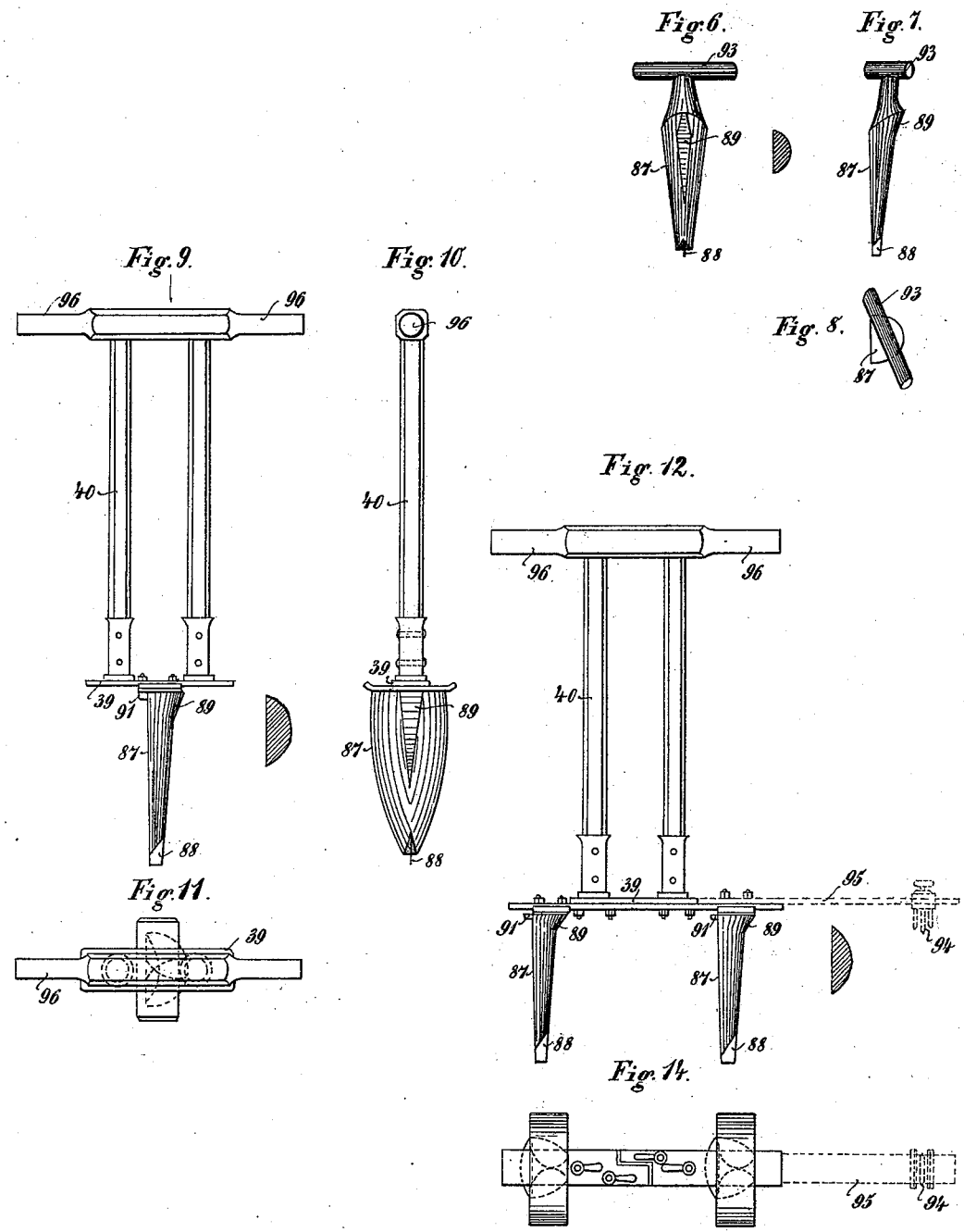

(No Model.) 4 Sheets—Sheet 4.
G. K. SPITZENBERG.
DIBBLING MACHINE.
No. 545,545. Patented Sept. 3, 1895.
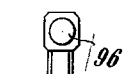
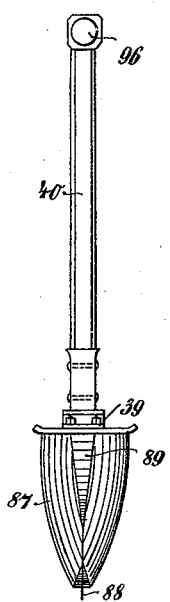
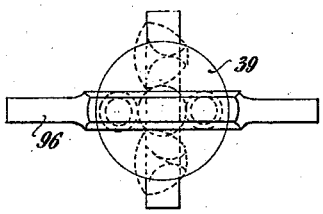
Witnesses.
Inventor.
G. K Spitzenberg
by R Haddan
Attorney.

UNITED STATES PATENT OFFICE.

GEORG KARL SPITZENBERG, OF FRANKFURTER NIEDERLAGE, GERMANY.

DIBBLING-MACHINE.

SPECIFICATION forming part of Letters Patent No. 545,545, dated September 3, 1895.

Application filed April 19, 1895. Serial No. 546,420. (No model.)

*To all whom it may concern:*

Be it known that I, GEORG KARL SPITZENBERG, a subject of the King of Prussia, German Emperor, and a resident of Frankfurter Niederlage, near Briesen, in the Kingdom of Prussia, German Empire, have invented a certain new or Improved Dibbling-Machine for Sinking Holes in the Earth for Plants, of which the following is a specification.

The object of this invention is to provide improved means for making holes in the ground of a suitable shape for receiving young plants.

Figure 4:
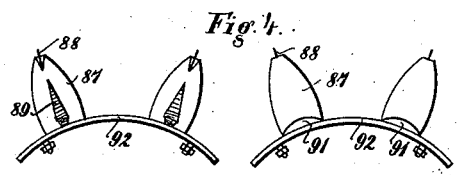
Figure 3:
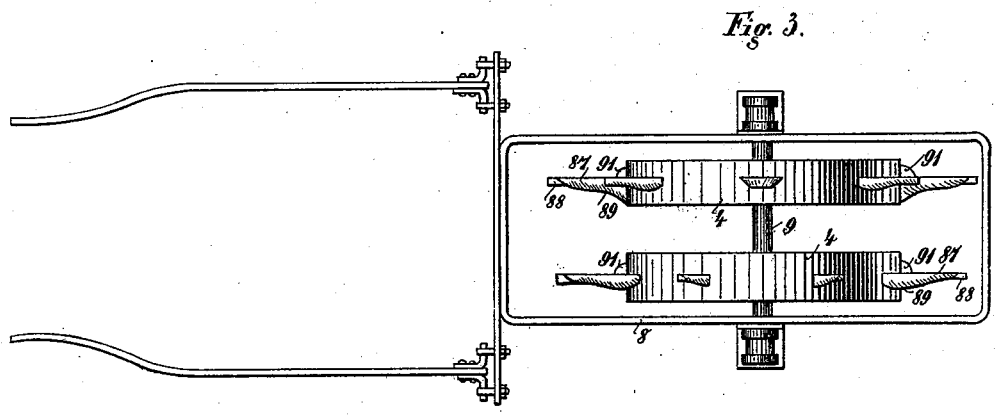
Figure 5:
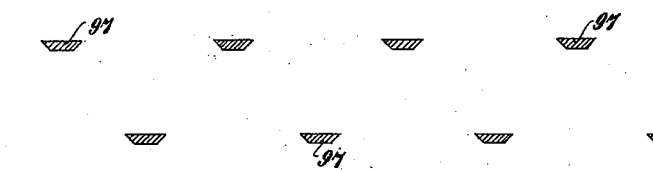

In the annexed drawings, Figure 1 is a side elevation, and Fig. 2 a plan view, of this invention in the form of a vehicular machine to be drawn by a draft-animal. Fig. 3 is a plan of a modified form thereof. Fig. 4 is a detail view showing the cutters from different sides. Fig. 5 illustrates in plan the disposition and shape of the holes made by such machine. Figs. 6, 7, and 8 are views of the same constructed as a hand tool or "dibbler." Figs. 9, 10, and 11 are views of the same made as a larger hand implement similar to a spade. Figs. 12, 13, and 14 are similar views of a modified form thereof; Figs. 15, 16, and 17, similar views of another modified form.

The device for making the holes aforesaid is intended to form a hole of such shape that a plant or cutting may be placed vertically therein and have a normal straight-root direction, all such holes being of uniform size, shape, and depth to insure uniformity in the planting.

The cutter 87, by which such hole is made, is of the following shape: On the one face it is flat and on the other face it is rounded semicircularly, while its thickness diminishes from the uppermost end or shoulder down to near its point or lower end, where it is beveled off to form a small horizontal cutting-edge in continuation of the two cutting-edges formed by the junction of the flat face with the rounded face, which latter cutting-edges are either straight, as in Fig. 6, or curved, as in Figs. 1, 4, 10, 13, and 16, the tool being in each case tapered in breadth from the upper end or shoulder to its lower edge or point. In the lower point is fixed a thin cutting-blade 88, projecting vertically downward from the beveled portion aforesaid to a short distance, its lower edge being horizontal and its side edges, respectively, aligned with the axes of the flat and the round faces of the body 87 of the cutter. On the rounded side of the body from the upper end to a suitable distance down the said rounded surface extends an angular projection 89, the outer face of which is flat and more inclined from the vertical than the rounded face of the cutter-body. The flattening extends some distance down the center of the rounded face, being gradually lost in the round of the face. This swelling 89 will widen the hole or slit in order to allow of a more convenient insertion of the plant and a better control of its actual position, owing to the larger amount of light thus admitted to the hole, and, lastly, compress the earth and tend to prevent particles of earth from dropping down the slit wall when the cutter is withdrawn. The flat straight surface of the cutter 87 may at the top be provided with a projection 91, serving to show an exact measure of depth for regulating the depth of insertion of the plant.

This device may be mounted on wheels for producing slits, and is shown in Figs. 1 to 3 in two methods of construction. On the wheel 4 curved plates or fellies 92, Fig. 4, carrying the slit-cutters 89, may be bolted. The weights 14 may be supplemented by the weight of the driver with advantage for producing the necessary pressure, and in this case the removable saddle 15 is fitted for the driver. The wheels 98, which are by means of the frame 43, connected to the fore frame 8, serve to prevent the apparatus from tipping over when provided with only one wheel 4.

The machine shown in plan view in Fig. 3 has two wheels 4, provided with slit-cutters 87, which, for securing a better distribution of the plants in the space at disposal are arranged in alternating rows, as shown at 97, Fig. 5. These slit-cutting implements may be made also for hand use.

The implement or dibbler illustrated in Figs. 6 to 8 consists of the slit-cutter 87 and of the handle 93 obliquely arranged thereon. This implement is used in a kneeling position.

In the implements shown in Figs. 9 to 17 the weight of the body of the person working can be utilized for facilitating the work connected with the producing of the slit. These implements are therefore provided with stems or shafts 40, which have handles 96 at the top and plates 39 below, on which latter the slit-cutters 87 are fixed, so as to be exchangeable. These hand implements, which are used in a standing position, are constructed in such a manner as to allow of an easy handling, while the foot can be put on them below. The two slit-cutters 87 are displaceably fixed to the plate 39, so as to be capable of being caused to approach or recede from one another. A displaceable marking-wheel 94 serves for designating the interval between the next slit section.

Figs. 15 to 17 show an implement which is similar in construction to that represented in Figs. 12 to 14, in which the position of the slit-cutters 87 toward the handling part 40 is modified. The cutting of the slit for inserting the plant is effected by applying the necessary pressure with a forward and backward movement.

The implements shown in Figs. 9 to 17 serve principally for occasional planting, while the implement shown in Figs. 6 to 8 serves likewise for odd planting, and can be used not only for cutting slits, but also for inserting the plant and closing the slit.

I claim as my invention—

1. A device for forming slits or holes for the reception of plants or cuttings, consisting of a tapered body 87 having a flat face and a rounded face joining to form cutting edges at the sides and beveled below to form a horizontal cutting edge, the latter carrying a transverse cutting blade 88.

2. A device for forming slits or holes for the reception of plants or cuttings, consisting of a tapered body 87 having a flat face and a rounded face joining to form cutting edges at the sides and beveled below to form a horizontal cutting edge, the latter carrying a transverse cutting blade 88, and having down the center of the rounded face a flattened portion extended outward above to form an angular projection.

3. A device for forming slits or holes for the reception of plants or cuttings, consisting of a tapered body 87 having a flat face and a rounded face joining to form cutting edges at the sides and beveled below to form a horizontal cutting edge, the latter carrying a transverse cutting blade 88, and having down the center of the rounded face a flattened portion extended outward above to form an angular projection and upon its flat face a projection 91 for designation of the cutting depth.

In testimony whereof I have signed this specification in the presence of two subscribing witnesses.

GEORG KARL SPITZENBERG.

Witnesses:
CHAS. H. MAY,
G. RATH.